Dec. 15, 1953 J. F. JOY 2,662,635
MATERIALS HANDLING APPARATUS
Filed May 24, 1949 11 Sheets-Sheet 4

INVENTOR:
Joseph F. Joy.
BY John F. Schmidt
ATTORNEY.

Dec. 15, 1953                J. F. JOY                2,662,635
            MATERIALS HANDLING APPARATUS
Filed May 24, 1949                            11 Sheets-Sheet 5

INVENTOR.
Joseph F. Joy.
BY: John F. Schmidt
ATTORNEY.

Dec. 15, 1953    J. F. JOY    2,662,635
MATERIALS HANDLING APPARATUS
Filed May 24, 1949    11 Sheets-Sheet 6

INVENTOR:
Joseph F. Joy.
BY: John F. Schmidt
ATTORNEY.

Dec. 15, 1953   J. F. JOY   2,662,635
MATERIALS HANDLING APPARATUS
Filed May 24, 1949   11 Sheets-Sheet 8

INVENTOR:
Joseph F. Joy.
BY: John F. Schmidt
ATTORNEY.

Dec. 15, 1953  J. F. JOY  2,662,635
MATERIALS HANDLING APPARATUS
Filed May 24, 1949  11 Sheets-Sheet 10

INVENTOR:
Joseph F. Joy.
BY: John F. Schmidt
ATTORNEY.

Patented Dec. 15, 1953

2,662,635

UNITED STATES PATENT OFFICE 2,662,635

MATERIALS HANDLING APPARATUS

Joseph F. Joy, Pittsburgh, Pa., assignor to Joy Manufacturing Company, Pittsburgh, Pa., a corporation of Pennsylvania Application May 24, 1949, Serial No. 94,949

31 Claims. (Cl. 198—220)

This invention relates to materials handling apparatus, especially to apparatus of the hydraulic type of shaker conveyor which combines the functions of loading and conveying.

There are numerous applications in the mining industry in which a self-propelled shaker loader could be used with great advantage. It would be advantageous in such applications to have a machine which could move about in the mine under its own power and which could load the material being mined and transmit it back to some collecting point for removal from the mine.

It is, accordingly, an object of this invention to provide a shaker conveyor which incorporates means to load the loose material that is being mined and is to be transported. It is another object to provide a completely reversible hydraulic shaker conveyor which may be used to transport mined material away from the mine face or which may alternatively be used to transport timbers and the like down to the mine face. It is a further object of the invention to provide a self-propelled machine having a substantial degree of mobility for movement in the mine. Another object is to provide a shaker conveyor which puts the pans in tension on the return or idle stroke for normal operation, permitting the use of lighter gage pans or, alternatively, permitting greater acceleration forces for the same weight of pans. Still another object is to provide supports for a shaker conveyor pan line which allow the pan line to be substantially straight along an uneven mine bottom. A still further object is a shaker conveyor drive head which keeps the pan line low.

The listed and other objects are accomplished in a hydraulic shaker conveyor having an articulated loader head connected to the shaker pan and reciprocable with it, the loader head being laterally movable in order to load and transport material from a wide area at the face; the shaker pan and loader are driven by a pair of hydraulic cylinders disposed at opposite sides of the pan, fluid being supplied to the cylinders by a pump from a reservoir; the shaker conveyor action is provided by moving the shaker pans and loader head hydraulically on the working stroke to move material away from the mine face and by resilient means connected to move the pan line on the return stroke; movement by the hydraulic cylinder is interrupted, and movement by the resilient means is thereby initiated, by a valve which interrupts the flow of fluid to the cylinder and vents the cylinder to the reservoir, the valve being actuated at regular intervals of a given number of pump revolutions; in order to avoid the use of a large capacity pump and drive therefor, an accumulator is used in the hydraulic system; inasmuch as the invention provides a completely reversible hydraulic shaker conveyor, a manually operable valve is provided in the hydraulic system to enable selection of the direction of material movement by selecting the end of the hydraulic cylinder which is to receive fluid, and means are closely associated with the last named valve for quickly stopping movement of the conveyor by by-passing fluid from the pump to the reservoir instead of allowing it to go to the cylinder; in order to allow the pans to assume a substantially straight line, wheeled pan supports are provided which may be adjusted to compensate for a floor that is not straight.

In the drawings:

Fig. 3 is a view in section on line 3—3 of Fig. 2a.

Fig. 12 is a view in section on line 12—12 of Fig. 1a.

Fig. 14 is a view in section on line 14—14 of Fig. 1a.

Fig. 23 is a view in section on line 23—23 of Fig 13.

Fig. 24 is a view in section on line 24—24 of Fig. 1a.

Mobility-providing mechanism

A base or base plate 2 provides the principal support for most of the mechanism making up this invention. To the under side of base 2, there are secured a plurality (herein shown as two) of supports 4 to engage the mine bottom. The supports 4 are preferably channels welded as shown at 6 to the under side of base plate 2, the long axes of the channels being preferably substantially parallel to the axis of the pan line, as will be understood by those skilled in the art. Holding jacks 8 to engage the roof or other mine wall are mounted on the top surface of the base 2 in any suitable manner as, for example, by threaded members 10 passing through a flange 12 at the base of each jack and engaging the base 2.

Another channel 14 is preferably inverted and has telescoping engagement with each of the channels 4. A transverse member 16 consisting of a short section of channel similar to channel 14 is preferably welded to the projecting rear ends of the channels 14 in order to hold the channels 14 together in a rigid assembly. A filler block 18 is secured in the end of each of channels 14 and has secured thereto, as by welding, a floor or ground engaging plate 20, which is preferably provided wtih serrations upon its ground engaging surface.

Figure 12:
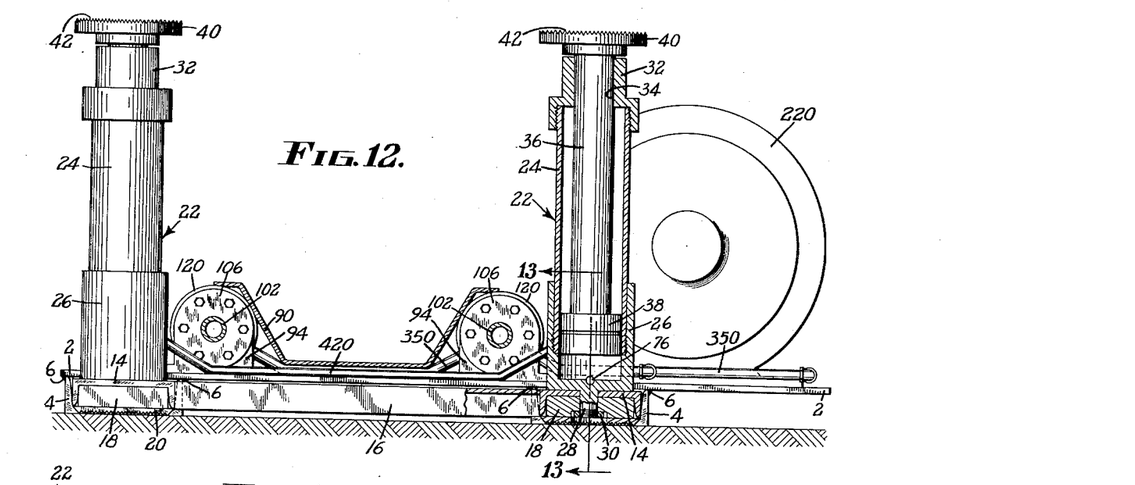

On the upper surface of each of channels 14, at the exposed ends, there is mounted a jack 22 which has for its object the engagement of a mine wall, in this instance, the roof. Such jack 22 is a hydraulic cylinder and is provided with a piston reciprocable therein. As is best seen in Fig. 12, a cylinder 24 is screwed into a base member 26, which in turn is provided with a stud 28. Stud 28 projects through openings in the channel 14 and filler block 18 and is threaded at its end to receive a nut 30. An upper end member 32 is screwed to the other end of cylinder 24 and is provided with a bore 34 through which passes a piston rod 36 to one end of which there is secured a piston 38 and the other end of which carries a roof-engaging member 40 which, like the ground engaging plate 20, is also provided with serrations as shown at 42.

As will be understood by those skilled in the art, the holding jacks 8 referred to above are substantially the same as the roof jacks 22 described above in detail. In order to move the machine along the mine bottom, feeding jacks 44 are provided and these also consist of a hydraulic cylinder with a piston reciprocable therein.

Figure 13:
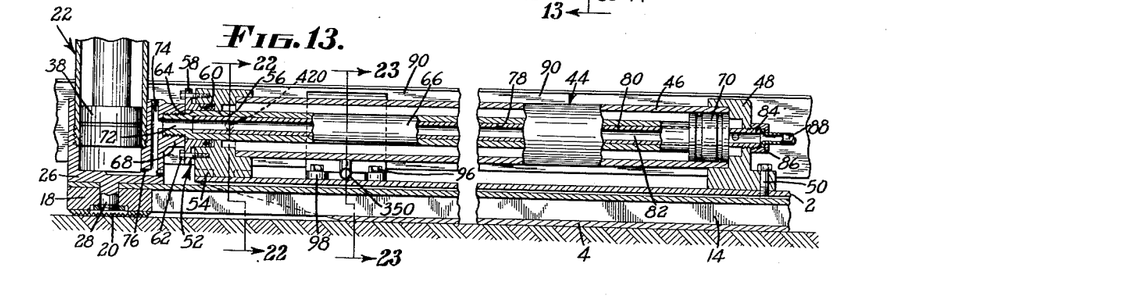
Fig. 13 is a view in section on line 13—13 of Fig. 12.

As is best seen in Fig. 13, a cylinder 46 has its one end secured to a cylinder head 48 which is secured to the base 2 in any suitable manner as by the threaded members 50. The other end of cylinder 46 is mounted in a stuffing box 52. Stuffing box 52 is carried on the very end of base plate 2, and consists of a cylindrical member 54 suitably secured to the base plate and having a central bore 56, and a packing gland 58 fitting in a larger bore 60 and held in place by threaded members 62. Packing gland 58 is itself provided with a central bore 64, which is of the same diameter as the bore 56 and is alined therewith to permit the passage therethrough of a piston rod 66 which at one end is screwed to a boss 68 on the base member 26 of jack 22 and which carries at its other end a piston 70.

The piston and piston rod are hollow and a passage 72 at the rearmost end of piston rod 66 communicates with a passage 74 in the base member 26, which in its turn communicates with the lower end of the cavity formed in the base member by means of an end passage 76.

The hollow piston and piston rod are provided with a central bore 78 which receives a telescoping tube 80. Tube 80 is threaded in its forward end into the cylinder head 48. Thus, the central passage 82 of tube 80 communicates with the lower end of the cylinder of roof jack 22 by means of passages 72, 74 and 76. The forward threaded end 84 of tube 80 projects forward through cylinder head 48 sufficiently to be engaged by any suitable coupling 86, which connects the hydraulic pressure line 88 to the tube.

The shaker pan and drive cylinders

Figures 23, 24:
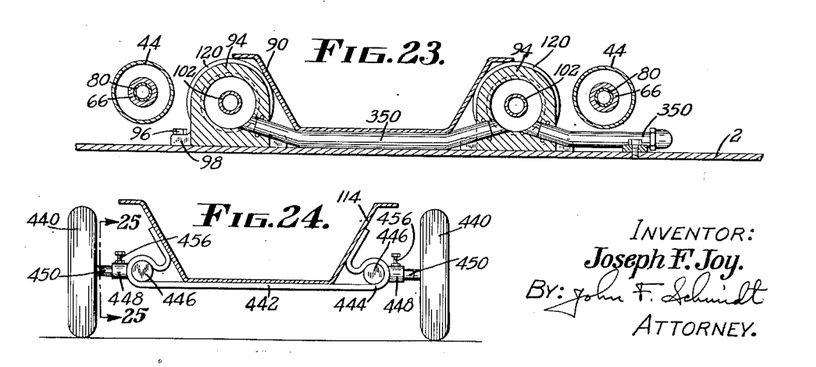

A shaker pan 90 is mounted for reciprocation on the base 2. Two hydraulic cylinders 92 are mounted on base 2 by means of cylinder heads 94 secured to the base in any suitable manner, as for example by threaded members 96 engaging the base through flanges 98 (Figs. 13 and 23) provided on the cylinder heads. Cylinders 92 have pistons 100 reciprocable therein. To each piston 100 there is secured a piston rod 102, which extends rearward from the piston, and another piston rod 104 extending forward from the piston. As will be understood by those skilled in the art, the rods 102, 104 may, if desired, be provided as one rod or may be in two pieces threaded or otherwise secured to piston 100. The rods pass through suitable stuffing boxes 106 in the cylinder heads 94.

Rod 102 at its rearward end engages a pan bracket; for convenience rod 102 is threadedly connected to a bolt 108 which passes through the two pan brackets 110 and 112 of the adjacent ends of pans 90 and 114. Thus, the rod connection to the pan bracket 112 serves at the same time to join two pans together. At the forward end rod 104 engages a pan bracket 116 which is secured to the pan 90. A bolt 118 passes through the loop in the pan bracket and engages the threaded end of rod 104.

Figure 1A:
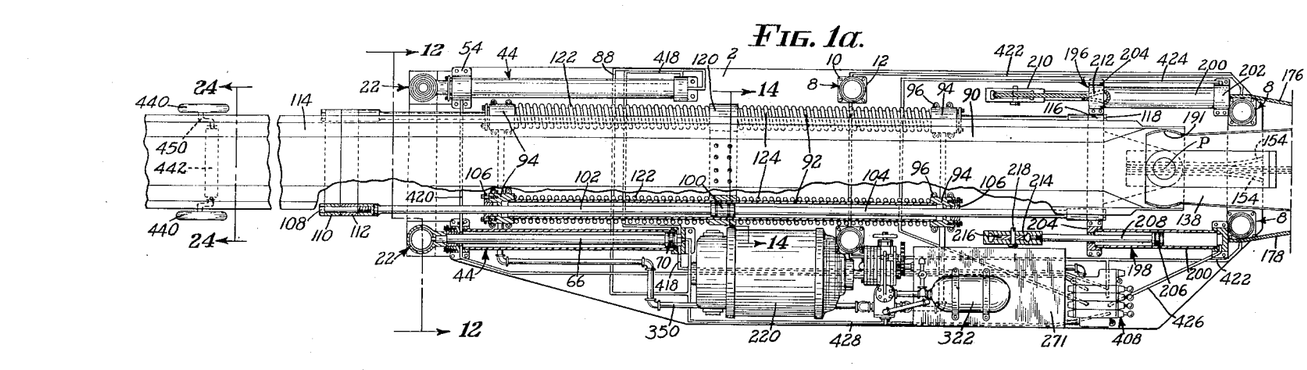
Figs. 1a and 1b taken together constitute a top plan view of a shaker conveyor made according to the invention.

Another pan bracket 120 is secured to the pan between its ends. In the neutral position of the shaker pan, pan bracket 120 is substantially midway between the cylinder heads at the opposite ends of the cylinders. It is held in this position by springs 122 and 124. As seen in Fig. 1a, a spring 122 is mounted on each cylinder 92 between the left-end cylinder-head 94 and the pan bracket 120 and a spring 124 is mounted on the cylinder between the right-end cylinder head 94 and pan bracket 120. When fluid is admitted into the right ends of the drive cylinders 92, the springs 122 will be compressed and when fluid is admitted into the left ends of cylinders 92, the springs 124 will be compressed. Thus, the springs 122 and 124 provide resilient means which oppose reciprocation of the pistons 100 in the drive cylinders and bias the pistons and the shaker pan 90 toward a neutral position.

The loader head

Figure 16:
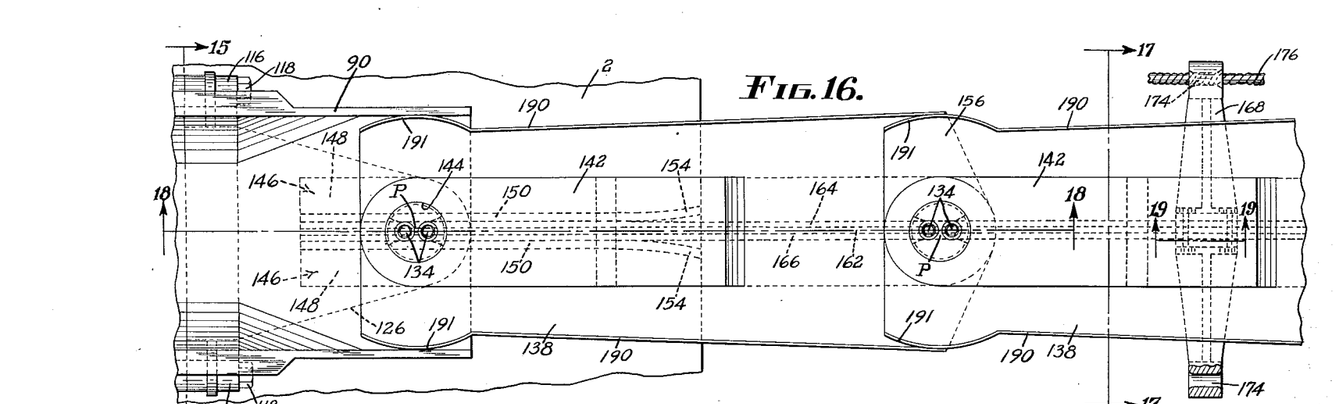
Fig. 16 is an enlarged top plan view showing details of the articulated loader head.
Figures 17, 18:
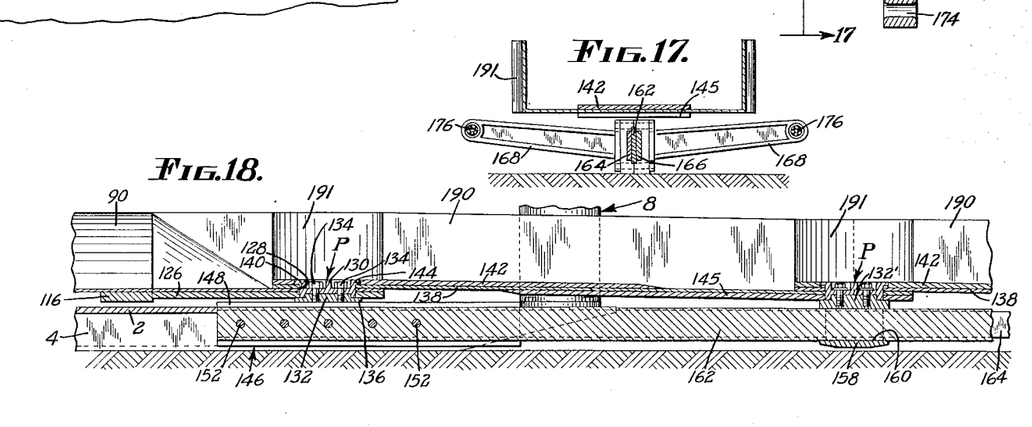
Fig. 17 is a view in section on line 17—17 of Fig. 16.
Fig. 18 is a view in section on line 18—18 of Fig. 16.

As is best seen in Figs. 16 and 18, the forward end of shaker pan 90 is reinforced at its under side by a reinforcing member 126. The pan bottom and reinforcing member 126 are provided with an opening 128, which receives the upper flanged portion 130 of a swivel or pivot P. The portion 130 is secured to a lower flanged portion 132 by threaded members 134. The lower flanged portion 132 carries a flange 136 which engages the under side of reinforcing member 126. An articulated loader pan 138 is held between the flange 140 on the upper flanged portion 130 and the upper surface of the bottom of shaker pan 90. An upper reinforcing member 142 is secured to the upper surface of the articulated loader pan 138 and is provided with an opening 144 which receives the flange 140. A similar reinforcing member 145 is secured to the under side of each loader pan 138 with its rearward end overlapping the forward end of member 142, and extending forward to the next pivot. At each pivot there are, accordingly, preferably four thicknesses of metal: the two articulated loader pans 138, an upper reinforcing member 142 and a lower reinforcing member 145.

Support means secured to the base 2 are provided in order to furnish some means to support the reciprocated loader head on the mine bottom. This support is shown as a three-leaf cantilever spring secured between clamping elements which are mounted on the base 2. These clamping elements consist, in the embodiment shown, of a pair of angle members 146 having horizontal arms 148 (see Fig. 15) lying on the upper face of plate 2, and vertical arms 150 extending through slots in the base plate 2. The arms 148 are preferably welded to the base plate. Bolts 152 pass through the vertical arms 150 and through the leaves of the spring and hold the leaf springs secure on the base. The horizontal arms 148 provide a horizontal bearing surface on which the lower flanged portion 132 of the pivot P slides. In order to allow the support to deflect laterally without producing high concentrations of stress, the vertical arms 150 are flared outward at their forward ends as shown at 154. See especially Figs. 15 and 16. To this end, the vertical arms 154 may be cut free of the horizontal arms at their forward ends.

The articulated loader pans 138 overlap as shown at 156. Furthermore, the overlap is in the normal direction of material movement, which is from right to left, as seen in the drawings. At each overlap the adjoining pan ends are provided with pivots P similar to the pivot described in detail above, except that the lower flanged portion 132' is provided with a depending element 158. Element 158 is provided with an opening 160 through which the support passes.

Figure 15:
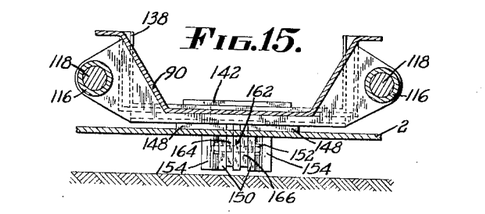
Fig. 15 is a view in section on line 15—15 of Fig. 16.
Figures 19, 20:
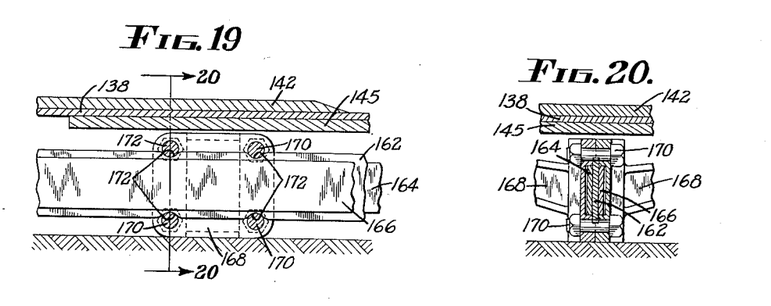
Fig. 19 is a view in section on line 19—19 of Fig. 16.
Fig. 20 is a view in section on line 20—20 of Fig. 19.

The support referred to is the three-leaf cantilever spring consisting of a wide middle leaf 162 and two narrower leaves 164 and 166 (see Figs. 15, 17 and 19).

As the loader pans reciprocate back and forth, they are supported on the support springs by means of the pivots P which slide on the springs. The depending portions 158 through which the springs pass provide the loader head with means connected thereto and to the support to restrain the head against transverse movement with respect to the support, while simultaneously permitting longitudinal movement. More specifically, as the support springs are swung to either side of the straight-forward normal position, the pivots P and their attached depending portions 158 carry the loader pans sidewise too.

Figure 1B:
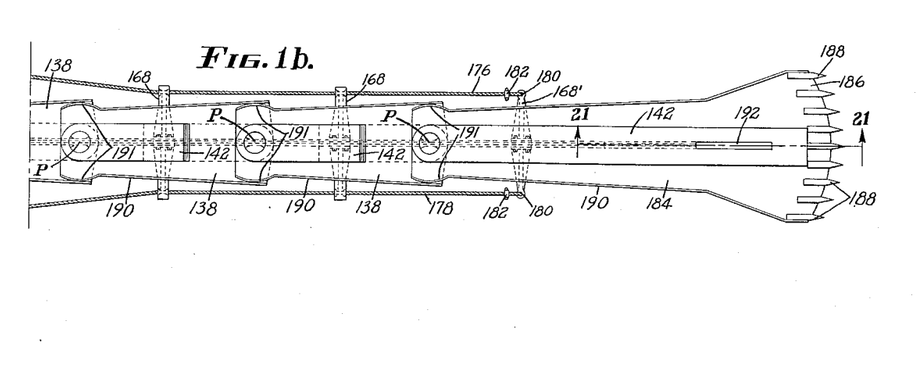

As will be explained in greater detail below, transverse members 168 are secured to the support at spaced intervals along the support. As is best seen in Fig. 20, the transverse members 168 are preferably made in two parts secured together by threaded members 170. The threaded members 170 engage recesses 172 in the wide spring 162 and are thereby held against longitudinal displacement with respect to the spring assembly. It may be noted here that the narrower leaves 164 and 166 are not in contact with the threaded members 170 and the three leaves of the springs are thereby allowed to move slightly with respect to each other as the support is flexed laterally. The end transverse member 168' is similar to the transverse members 168 in the respects thus far described. It is to be noted, however, that the transverse members 168 are provided at their outer ends with openings 174 (Fig. 16) to receive tension members 176 and 178, such as cables of any suitable material, whereas the transverse member 168' is provided at its outer ends with eyes 180 (Fig. 1b) through which the tension members 176 and 178 pass. The tension members 176 and 178 are doubled back for a short distance and the ends are secured by any suitable clamps 182.

Figure 21:
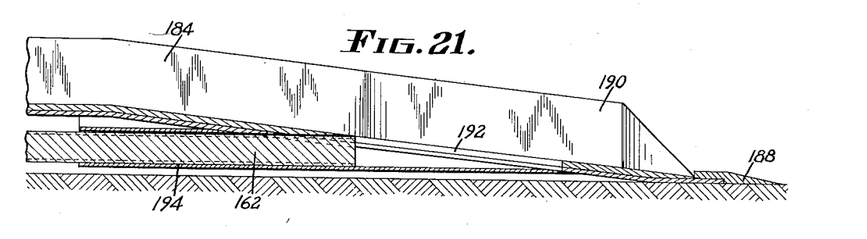
Fig. 21 is a view in section on line 21—21 of Fig. 1b.
Figure 22:
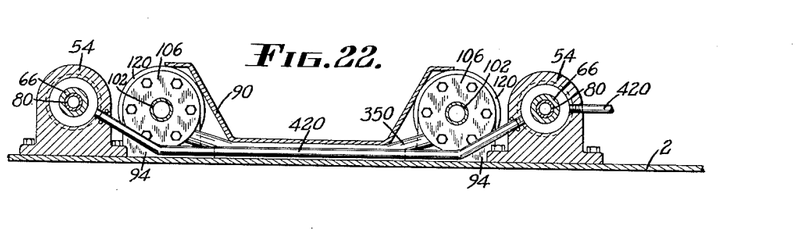
Fig. 22 is a view in section on line 22—22 of Fig. 13.

The foremost loader pan 184 is provided with a diverging mouth portion 186 to which teeth 188 are secured. Upward extending sideboards 190 are provided on the loader pan 184, terminating in arcuate ends 191 which cooperate with the forward ends of the sideboards of the loader pan 138 next adjacent, and so on back toward the mine mouth. This loader pan 184 is provided at its middle with a slot 192 (Fig. 21) to receive the forward ends of the cantilever spring leaves; preferably an open-ended box 194 is provided on the under side of the loader pan portion 184 in communication with the slot 192 and receiving the cantilever spring.

To effect lateral displacement of the support for the loader pans, swing means are provided, being secured to the base and connected to the tension members (Fig. 1a). The swing means comprise hydraulic jacks indicated generally at 196 and 198. Each swing jack consists of a cylinder member 200 secured to the base by a cylinder head 202 and a stuffing box 204 held in place by any suitable means, and a piston 206 reciprocable in the cylinder 200 and being connected to a piston rod 208 which passes through the stuffing box 204 and carries at its rearmost end a pulley block 210. The end of the tension member is secured to any suitable anchor point 212 which may conveniently be the upper side of the stuffing box 204. Each pulley block consists of a pulley support 214 secured to the end of piston rod 208 and a pulley 216 rotatably mounted in the support by means of a pin 218.

The shaker drive

To effect the desired drive of the shaker pan and the loader pans, means must be provided to furnish hydraulic fluid under pressure to the drive cylinders 92. To this end, an electric motor 220 is mounted on the base 2 and is connected to drive a gear pump 222 by means of motor shaft 224 being splined to one of the gears 226 of the pump. The pump is of the variable displacement type, for which purpose the gear 228 which meshes with gear 226 is rotatably mounted in needle bearings 230 on a stub shaft 232 which in turn is mounted in a movable block 234.

The block 234 is made up of a pair of side members 236 and a middle member 238 fastened together by means of bolts 240. Block 234 is slidable in a rectangular recess 242 in pump housing 244, being movable along an axis which is parallel to a line connecting the centers of gears 226 and 228. To control the position of block 234, its middle member 238 is provided with a recess 246 and a slot 248 communicating therewith. The casing 244 is bored and threaded at 250 in horizontal alinement with the recess 246 and slot 248 (see Fig. 5).

An adjusting screw 252 carrying a hand wheel 254 has threaded engagement with the threaded bore 250 and carries at its inner end a head 256 which operates in the recess 246. A short shaft 258 connects the head 256 to the screw 252. As is readily seen in Fig. 5, the screw 252 applies its force at the high pressure side of a line passing through the centers of the two gears, in order to take into account the fact that that portion of the block above the aforesaid line of centers is subjected to a greater pressure and therefore to a greater displacing force. As is readily seen in Fig. 6, the gear 226 is splined to the motor shaft 224 which is rotatable in bearings 260 in the pump housing. The axis of the gear 226 is therefore fixed with respect to the pump housing.

The pump housing is provided with a hydraulic fluid intake 262 in the form of a bore or passage in the lower side of the casing and a discharge 264 in the form of a passage in the upper portion of the casing. The intake passage communicates with another passage 266 in a leg 268 which supports the pump housing. A conduit 270 communicates with the passage 266 and brings fluid from a hydraulic fluid reservoir 271.

A shaker drive control stop-valve 272 is connected to communicate with the pump discharge 264. In the preferred embodiment of the invention, the valve 272 is mounted in a casing or housing 274 which is integral with the pump housing; see especially Fig. 5. Housing 274 is provided with a bore 276 in which a sleeve 278 is held between the upper end of a leg 280 and a cover plate 282. Sleeve 278 is provided with three sets of radial, circumferentially spaced ports 284, 286 and 288.

Sleeve 278 is itself provided with a circular bore 290 in which a reciprocating member 292 of the valve is mounted. The member 292 is provided with a large diameter piston portion 294 at its upper end and with a collar 296 of like diameter, the piston portion 294 and collar 296 being connected by a stem 298.

Below the collar 296, there is provided on the reciprocating member 292 a guide collar 300 which is of a diameter sufficient to substantially fill the bore 290 but is recessed as shown at 302 in order to permit fluid flow from one side of the guide collar to the other. Below the guide collar the reciprocating member is provided with an extended stem 304, and a coil spring 306 is disposed in a bore 308 in the leg 280, the stem 304 serving as a guide for the spring, the lower end of which abuts against the bottom of the bore 308 and the upper end of which engages the collar 300.

At its upper end the reciprocating member 292 is provided with an actuating stem 310 which extends through a bore in the cover plate 282. The stem 310 is secured to the piston member 294 by any suitable spider in order to provide easy passage for fluid from the space above the upper end of the reciprocating member through the reciprocating member to the bore 308. The reciprocating member is provided with a central passage or bore 312 which extends throughout its length, in order that the member may be freely movable in the bore 290, and not be hindered in its movement by fluid trapped between the ends of the member and the ends of the bore or cavity in which it reciprocates.

The valve casing or housing 274 is provided with internal annular grooves 314, 316 and 318 which are disposed in communication with ports 284, 286 and 288 respectively. The groove 318 communicates with the pump intake 262 by a passage 319 provided in the pump housing.

A conduit 320 communicates at its one end with the annular groove 314 and at its other end carries an accumulator 322 of the enclosed bladder type, such as is shown in Patent Number Re. 23,437. Thus, it will be seen that the accumulator is always in communication with the pump discharge. A conduit 324 is provided with a relief valve 326 and communicates the conduit 320 with the reservoir 271.

Valve housing 274 is provided with an extension 328. The extension 328 houses a reversing valve and quick-stop-valve mechanism and to that end is provided with a bore 330 and a cover plate 332. Bore 330 communicates with annular groove 316 by means of a passage 333. A rotatable body 334 has a stem 336 which is integral with the body 334; the stem is keyed to a hub 338, to which a handle 340 is pivotally mounted at 342 for movement in a plane passing through the axis of rotation of the body 334.

Figure 5:
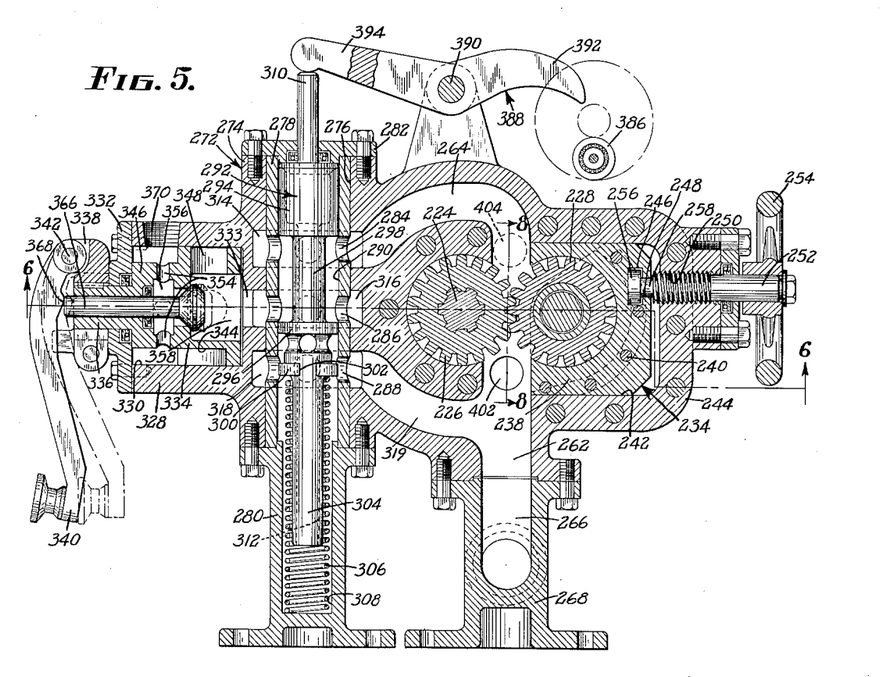
Fig. 5 is a view in section on line 5—5 of Fig. 4.

Body 334 substantially fills the bore 330 at its right end as seen in Fig. 5, except where it is cut away or recessed at 344. At the left end 346 of the body 334, the diameter is reduced substantially in order to provide the free passage of fluid all around the circumference of the body. The large end of body 334 is provided with a radial bore 348 which is positionable to communicate with conduits 350 and 352 leading to the left and right ends respectively of the drive cylinders 92. It will be noted that the radial bore or passage 348 is diametrically opposed to the recess 344, so that when the bore 348 communicates with conduit 350 (Fig. 9), the recess 344 communicates with the conduit 352; and when the bore 348 communicates with the conduit 352 (Fig. 10), the recess 344 communicates with the conduit 350.

The small end 346 of the rotatable body is provided with circumferentially spaced radial bores 354 communicating with the hollow interior 356. The large end of the rotatable body 334 is also hollow as shown at 358 and this hollow is open to the right, as seen in Fig. 5, and communicates with the annular groove 316 through passage 333 as well as with the radial bore 348. Wall 360, which separates the hollow 358 from the interior of the small end 346, is provided with a communicating bore or passage 362. The passage 362 is adapted to be normally closed by a closure member 364 mounted on a stem 366 and movable inward to open the passage 362 in order to communicate the two interiors. The stem 366 is reciprocable in a bore in the stem 336 and extends out through the end of stem 336 in order to be engaged by a projection 368 on the handle 340.

Housing extension 328 is provided with a radial bore or passage 370 opposite end 346 of rotatable body 334, and a conduit 372 threaded into the passage 370 communicates the bore 330 with the reservoir. Thus, the passage 370 and conduit 372 constitute an exhaust passage for low pressure fluid returning to the reservoir.

Figure 3:
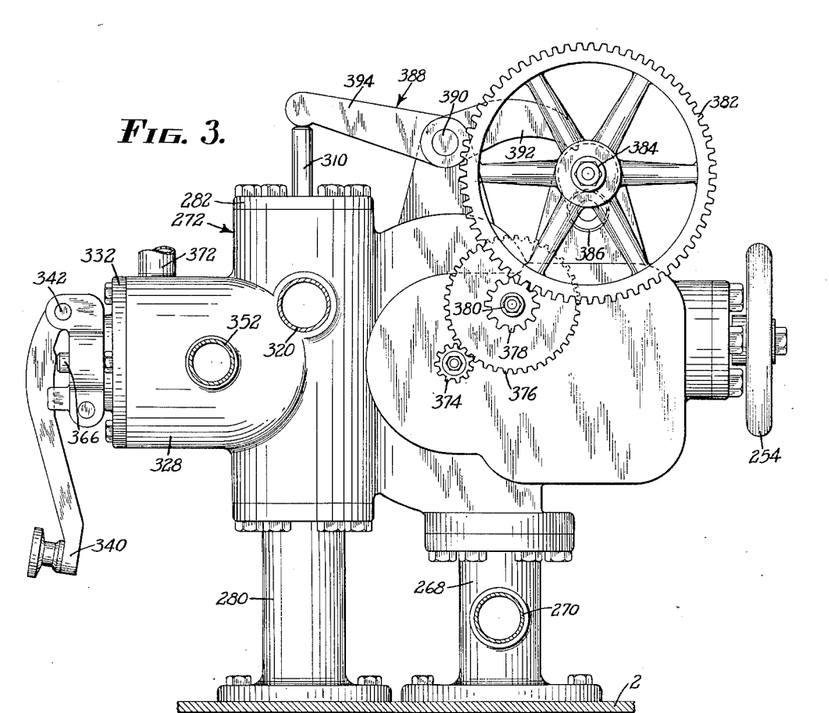
Figure 4:
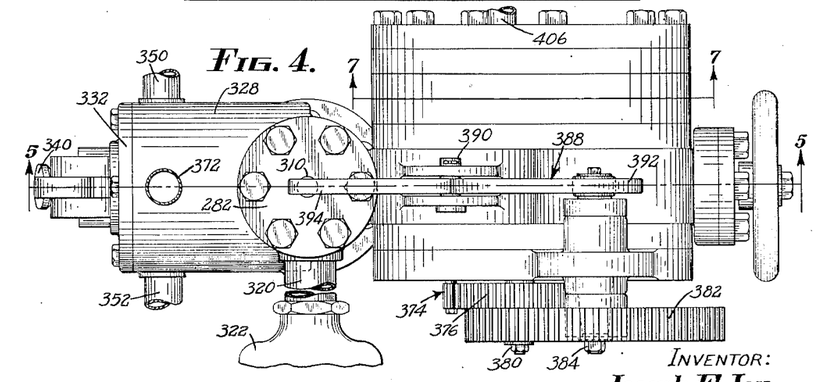
Fig. 4 is a top plan view of the pump, stop-valve and actuating mechanism therefor, and reversing valve, being a top plan view of the portion of the invention shown in Fig. 3.
Figure 6:
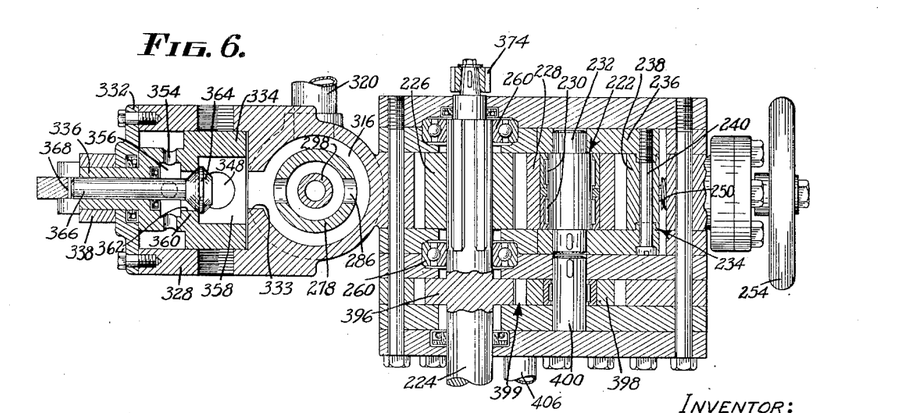
Fig. 6 is a view in section substantially on line 6—6 of Fig. 5.

As is best seen in Fig. 6, motor shaft 224 is provided at its end with a pinion 374. Pinion 374 meshes with and drives a gear 376 (Fig. 3), which is coaxial with and drives another gear 378. Gear 378 is preferably splined to its shaft and is held in place by a nut 380. Gear 378 meshes with and drives a large gear 382 which is similarly splined to a camshaft and held in place by a nut 384. Gear 382 thus drives a roller cam 386 mounted on the camshaft.

A rocker arm 388 is pivoted at 390 and has a cam-engaging arm 392 in position to be engaged by the roller cam 386. Another arm 394 of the rocker is in position to engage the stem 318 of the reciprocating member 292.

As will be understood by those skilled in the art, the gears 378 and 382 will be readily replaceable by other gears to provide a different gear ratio for the gear train driving the cam. The gear train shown insures that the reciprocable member 292 of the valve 272 will be actuated at intervals of a given number of revolutions of the gear 226, depending upon the various gear ratios in the gear train. This interval may be varied by substituting various gears 378 and 382 having the desired ratios to provide different intervals.

The subject matter of valve 272 and its co-operation with pump 222 are not claimed in this application, but are disclosed and claimed in my divisional application, Ser. No. 387,749, filed October 22, 1953, and assigned to the assignee of this application.

*The hydraulic system for moving the machine*

Figure 7:
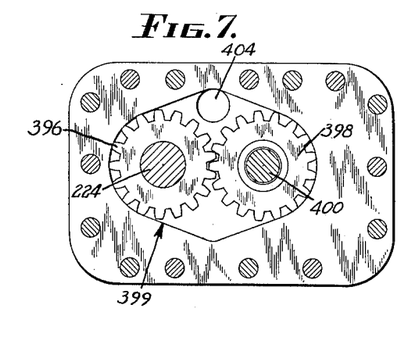
Fig. 7 is a view in section on line 7—7 of Fig. 4.
Figure 8:
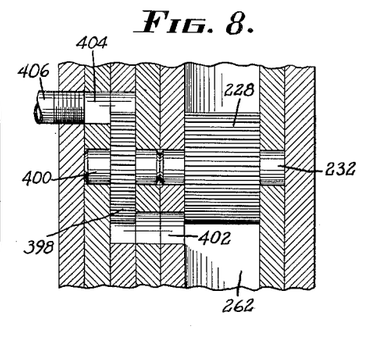
Fig. 8 is a view in section on line 8—8 of Fig. 5.

The hydraulic system for moving the machine along the mine bottom will now be described. As can be seen in Fig. 6, a gear 396 is integral with the motor shaft 224 and meshes with a gear 398. Gear 398 is mounted for rotation on a shaft 400 (Figs. 6–8).

Gears 396 and 398 comprise a rotary gear pump 399 having an intake passage 402 which communicates with the intake passage 262, and a discharge passage 404 which communicates with a conduit 406. Conduit 406 goes to a control valve 408, the details of which form no part of this invention and are not disclosed herein.

Valve 408 is made up of a number of control sections 410, 412, 414 and 416. The section 410 of the valve is connected by conduits 418 and 420 with the right and left ends, respectively, of the double-acting feed cylinders 44. The section 412 is connected by a conduit 422 with the holding or roof jacks 8. The section 414 is connected by conduits 424 and 426 with the swing cylinders 196 and 198 respectively. The section 416 is connected by a conduit 428 with the conduit 88 to supply fluid to the roof jacks 22 through the telescoping tubes 80.

The low pressure or exhaust side of the control valve 408, shown at 430, is connected by a conduit 434 with the reservoir.

*The pan carrying means*

Figure 14:
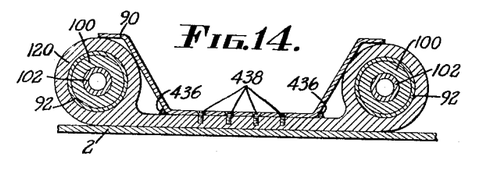

As is probably best seen in Fig. 14, the shaker pan 90 is secured to pan bracket 120 in any suitable manner as by the welds shown at 436 and by threaded members 438. Pan bracket 120 in turn slides on base plate 2 and, to facilitate the sliding contact, suitable rubbing plates of any desirable material, not shown, may be provided as will be understood by those skilled in the art.

Away from the machine, in the direction of the mine entry, the pan line is preferably supported on rubber tired wheels 440; see Figs. 1a, 24, 25, 26, 28 and 29. Wheels 440 are preferably provided, one pair for each pan length, somewhere between the ends. It is desirable that the wheels support the pan not precisely at the middle of the pan, but at some point either side of the middle, so that a workman may take the heavy end of the pan and manipulate the pan very much like a wheelbarrow to maneuver it into and out of position and in and about the mine.

To this end, a wheel mounting bracket 442 is secured in any suitable manner to the pan bottom, to one side of the middle. If desired, a standard pan bracket having the usual loops 444 may be used rather than providing a special bracket for this purpose. If a standard pan bracket is used, it may be found desirable to put short cylindrical plugs 446 in the loops 444.

Wheel supporting bosses 448 are preferably welded to the outside faces of the loops 444. The bosses 448 are internally splined to receive the splined ends of cranks 450. The other ends of the cranks are provided with wheel supporting bearings as will be understood by those skilled in the art. The splined end 452 of each crank 450 is circumferentially grooved as shown at 454 to receive a set screw 456 to hold the splined end against accidental withdrawal. A lock or jam nut 458 is desirably provided to hold the set screw against loosening.

It will be understood by those skilled in the art that a wheel mounting of the type shown will allow the operators to adjust the height of the pan, according to the conditions encountered, simply by withdrawing the splined end 452 and reinserting it to provide the desired pan height. To give a maximum of adjustability, a large number of splines will preferably be provided.

OPERATION

*Moving the machine about the mine*

Let it be assumed that the parts of the machine occupy the positions shown in Figs. 1a, 2a, 12, 13, and 30 with motor 220 running to drive the gear pump 399. The operator manipulates the valve section 416 to admit high pressure fluid from the conduit 406 to the conduit 428, conduit 88, the two telescoping tubes 80, passages 72, 74 and 76 into the lower ends of the cylinders of jacks 22. The pressure operates against the lower face of each piston 38 and raises the piston in the cylinder until the members 40 of both jacks tightly engage the roof; the floor engaging members 20 are then pressed tight against the mine bottom or floor.

Figure 30:
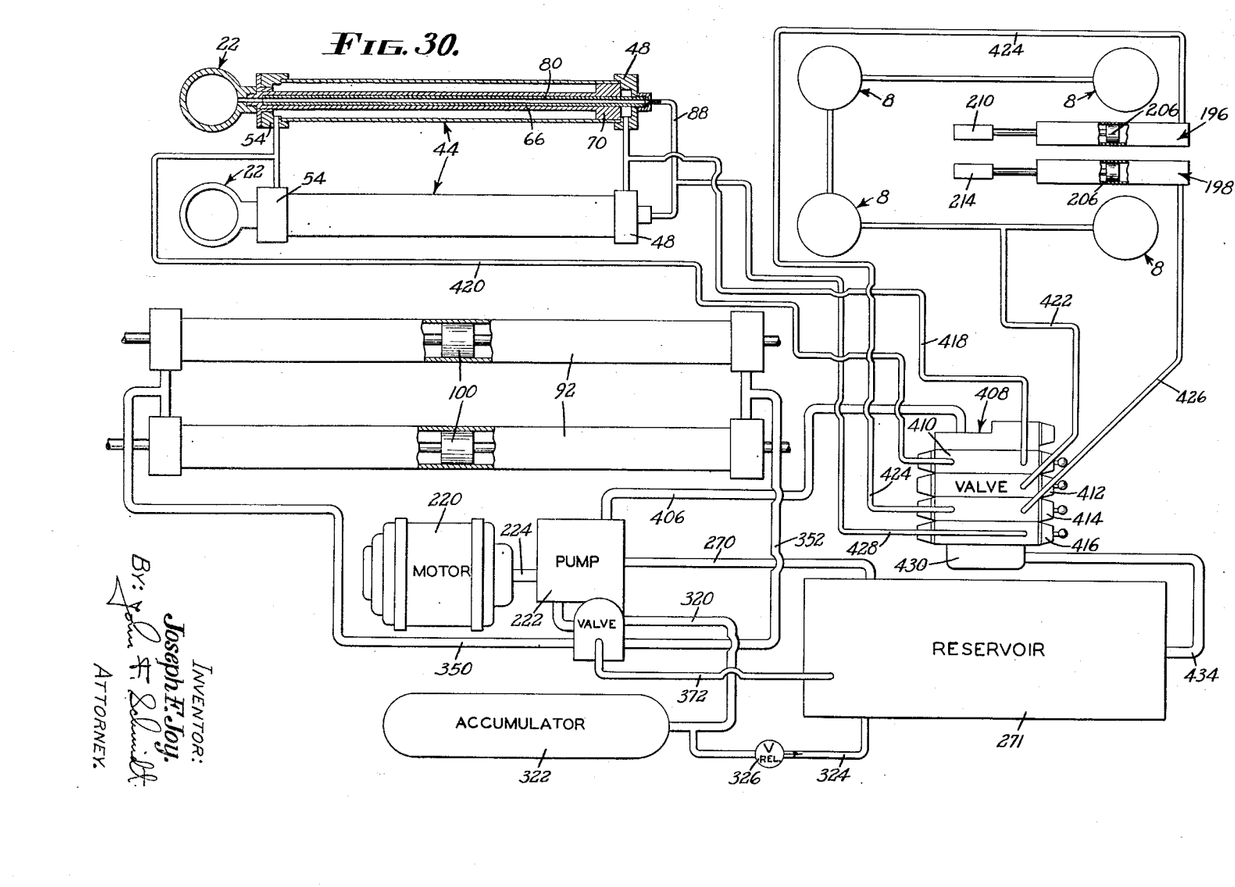
Fig. 30 is a circuit diagram of the hydraulic system of the conveyor.

The operator thereupon manipulates the valve section 410 in order to admit high pressure fluid from conduit 406 to conduit 418 to the right ends of feed jacks 44. More specifically, fluid is admitted to the cylinder heads 48 and engages the right hand faces of pistons 70, moving the cylinder heads to the right, as seen in Figs. 1a, 13 and 30. The high pressure fluid thus forces the channels 4 to slide forward, pushing the base plate and all the rest of the machine in the forward direction. It will be noted that throughout this forward movement, the valve section 416 must be maintained in position to supply fluid under pressure to the jacks 22, inasmuch as the volume available to the fluid in jacks 22 increases as the machine moves forward because of telescoping tube 80 pulling out of piston rod 66.

With the machine advanced for the full length of the stroke of pistons 70, valve sections 416 and 410 are returned to their neutral positions in order that conduits 428 and 418 may be vented to the exhaust line 434. The valve section 412 is now manipulated to provide high pressure fluid from conduit 406 to conduit 422 and thus to the holding jacks 8. These jacks thereupon engage the roof, whereupon valve section 410 is manipulated to admit high pressure fluid to conduit 420 to the left ends of cylinders 46. Pistons 70 are thereupon moved to the right as seen in Figs. 1a, 13, and 30, and the channels 14 are thereupon telescoped into the channels 4. To advance the machine further, the cycle is repeated.

In order to back the machine up, the steps outlined above will be reversed, namely, with the holding jacks 8 engaging the roof and with jacks 22 down, fluid is admitted to the right ends of cylinders 46 by manipulating valve section 410 to admit fluid to the conduit 418. The resultant movement of pistons 70 moves the channels 14 and their jacks 22 rearward. The valve section 412 is thereupon restored to neutral to enable the holding jacks 8 to become disengaged from the roof. Valve section 416 is thereupon manipulated again to admit fluid under pressure to jacks 22, causing those jacks to engage the mine roof. Valve section 410 is then manipulated to admit fluid to the left ends of cylinders 46 through conduit 420, forcing the cylinders 46 to the left and pulling the channels 4 and the rest of the machine rearward.

*Swinging the loader head laterally*

Figures 25, 26, 27:
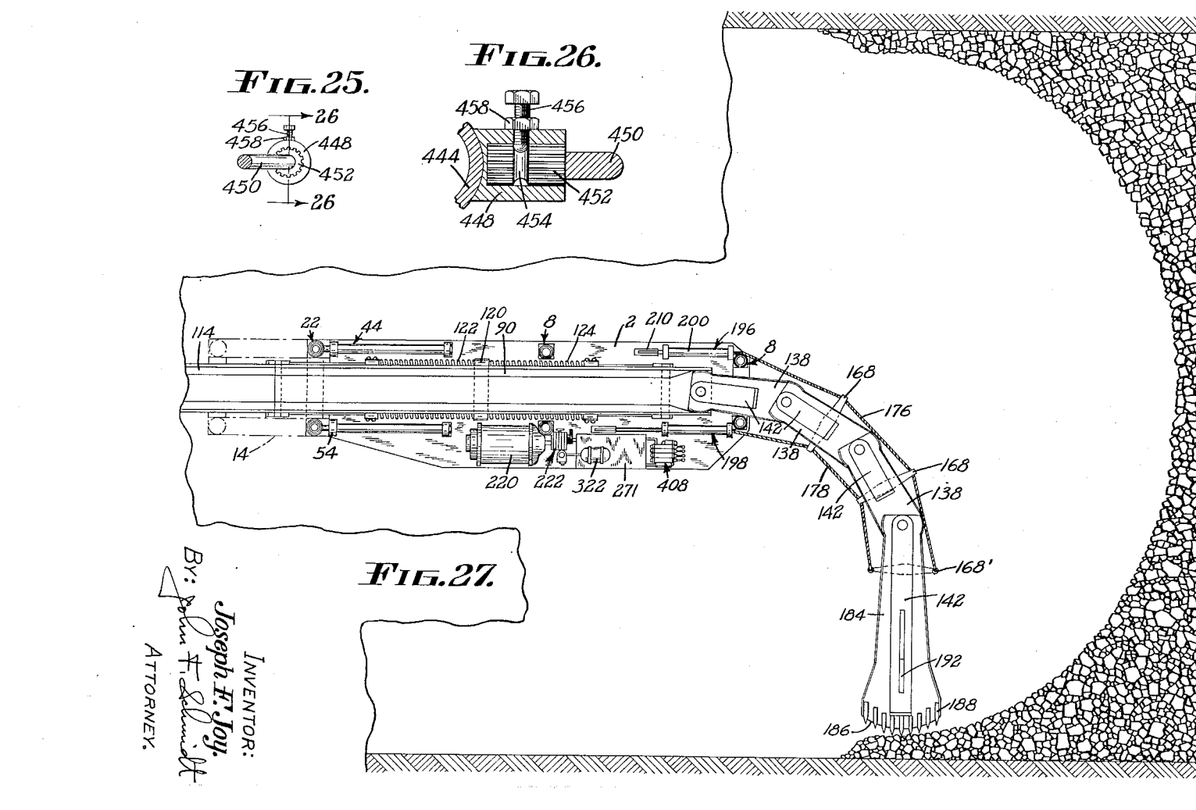
Fig. 25 is a view in section on line 25—25 of Fig 24.
Fig. 26 is a view in section on line 26—26 of Fig. 25.
Fig. 27 is a top plan view of the invention showing the articulated loader head swung over to its extreme operating position at one side of the pan line

Let it be assumed that the operator desires to swing the loader head to the right, into the position shown in Fig. 27. To accomplish this swinging movement, the operator manipulates the valve section 414 to admit high pressure fluid to the conduit 426, thus pushing piston 206 of jack 198 to the left as seen in Figs. 1a and 30. This leftward movement of the piston 206 moves the pulley block 214 also to the left, putting tension on the tension member 178. This tension moves the loader head around to the right, the extreme position of which is shown in Fig. 27.

Return of the loader head to the neutral or straight ahead position is accomplished by manipulating the valve section 414 to connect conduit 426 to exhaust and to admit high pressure fluid to the conduit 424 and to the right end of the swing cylinder or jack 196.

As tension is applied to the tension member 178, the transverse members 168 and 168' are pulled around to the right, necessarily pulling with them the support which is the cantilever spring. The middle leaf 162 is firmly clamped between the two halves of each of the two transverse members 168 and 168'. The two outside leaves 164 and 166 are restrained in the recess provided in the two halves in the transverse members 168 and 168' against lateral movement with respect thereto and thus will also bend around to the right. However, the leaves 164 and 166 are allowed to move longitudinally with respect to the middle leaf 162 and with respect to the transverse members. Thus, the two leaves have a limited amount of sliding movement with respect to each other as the spring support is flexed from side to side.

As the support swings laterally, it carries with it the depending members 158 of the several pivots P. The depending members are provided with openings as described above to permit longitudinal movement of the pivots P with respect to the support, but are, of course, carried sidewise by the support and thus carry the loader pan sections sidewise with the support to reorient the direction of the wide-mouth end 186 of the loader head.

*Reciprocation of the shaker and loader pans*

Figure 10:
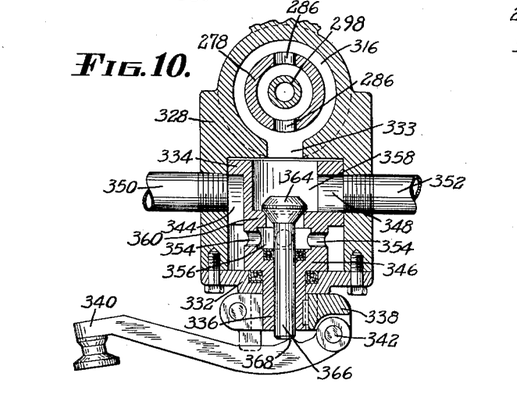
Fig. 10 is a view similar to Fig. 9, but showing the valve reversed for operation of the conveyor to convey material away from the mine face.

For a description of the operation, let it be assumed that the direction-determining valve handle 340 is in the position shown in Fig. 10, and that the stop-valve 272 is in the position shown in Fig. 5. Fluid under pressure passes through the pump discharge 264, into the annular groove 314, through the ports 284, into the inside of the sleeve 278, out through ports 286, into the annular groove 316, through passage 333, into the hollow 358 of the valve body 334, through radial passage 348, and through conduit 352 to the right ends of the drive cylinders 92. The pistons 100 are thereupon moved leftward compressing springs 122 between the pan bracket 120 and the left hand cylinder heads 94.

Figure 11:
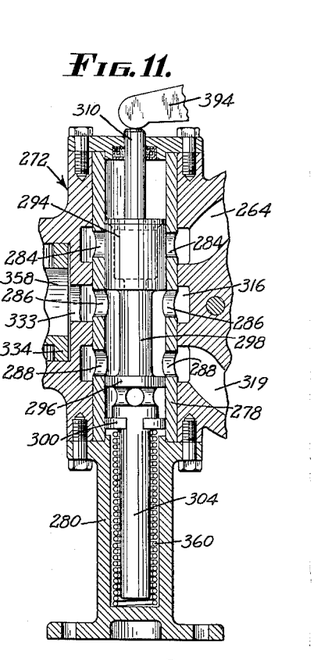
Fig. 11 is a view of a portion of the mechanism shown in Fig. 5, but showing the stop-valve in position to block fluid flow from the pump to the drive cylinder and in position to vent fluid from the drive cylinder to the reservoir.

After a predetermined interval depending upon the speed of pump rotation and the ratio of the gear train comprising gears 374, 376, 378 and 382, the roller cam 386 comes into contact with arm 392 of the rocker 388, pivoting the latter counterclockwise and bringing arm 394 down on the stem 310 of the reciprocable member 292 of the stop-valve, into the position shown in Fig. 11. With the valve in this position, the piston member 294 completely blocks the ports 284 of the sleeve, preventing the transmission of hydraulic fluid to the drive cylinders. Note, however, that the accumulator continues to be connected with the pump discharge.

Figure 2A:
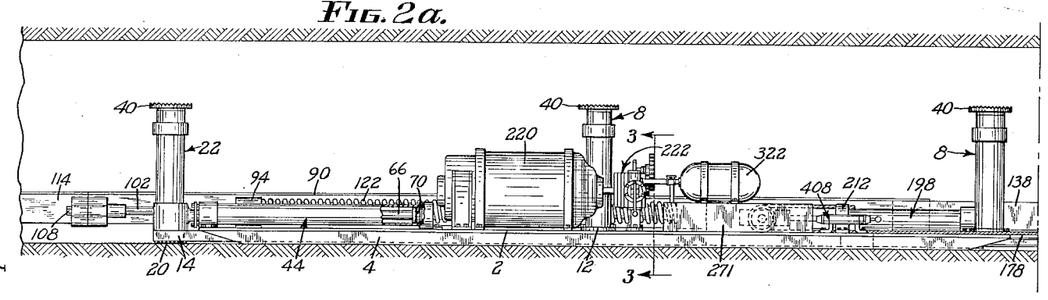
Figs. 2a and 2b constitute a side elevation view.
Figure 2B:
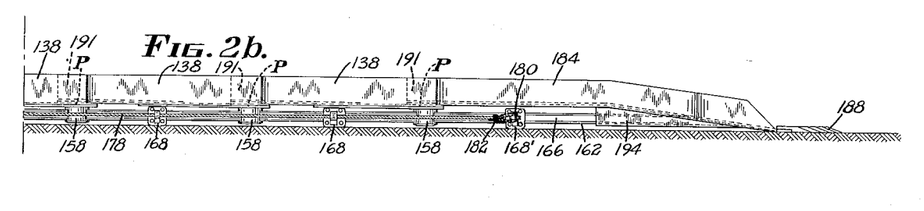

With the parts in the position shown in Fig. 11, collar 296 has uncovered ports 288 and the motor cylinders, which were a moment ago in communication with high pressure fluid, are now connected with the exhaust line through the conduit 352, radial passage 348 (Fig. 10), annular groove 316, ports 286, the interior of sleeve 278, ports 288, passage 319, passage 262, passage 266, and conduit 270 back to the reservoir. Under these circumstances, the springs 122, which have been compressed to a maximum, are allowed to expand, giving up their energy and as a result the entire shaker and loader pan assembly is pushed smartly to the right as shown in Figs. 1a and 2a.

The design of the mechanism is such that movement of the pan line by the hydraulic fluid does not pull the pans out from under the material being conveyed, but the acceleration given to the pan by the springs on the return stroke is great enough to slide the pans under the material which is being moved along the pan.

As the roller cam 386 continues to rotate, arm 392 drops off the cam and spring 306 returns the reciprocable member 292 of the stop valve to the position shown in Fig. 5, and the cycle is repeated.

It may be noted here that the pump 222 need not be large enough to provide the full capacity required for the maximum movement of the drive cylinders with accumulator 322 continuously in communication with the pump discharge. When the drive cylinders are not connected with the pump discharge (as when the parts are in the position shown in Fig. 11) then fluid energy is stored in the accumulator which returns its energy to the system when the requirements for high pressure fluid are greater than the pump can supply.

With the direction-determining valve in the position shown in Fig. 10, the right-hand ends of the drive cylinders are in communication with the pump 222 by way of conduit 352 and valve 272. If now it is desired to reverse the direction of drive of the shaker and loader pans, as for example, if it should be desired to convey something from the mine opening toward the face, handle 340 will be turned around to the position shown in Fig. 9. With the direction-determining valve handle 340 in the position shown in Fig. 9, the right ends of the drive cylinders are connected with the reservoir by means of the conduit 352, recess 344, passage 370 (Fig. 5) and conduit 372. With the handle 340 in the position shown in Fig. 9, the left ends of the drive cylinders are exposed to fluid under high pressure through the conduit 350, radial bore 348, hollow 358, annular groove 316, ports 286, the interior of sleeve 278, ports 284, groove 314 and pump discharge 264.

The operation of the valve 272 is the same regardless of which ends of the drive cylinders are receiving fluid so that operation of the valve need not be repeated here.

Figure 9:
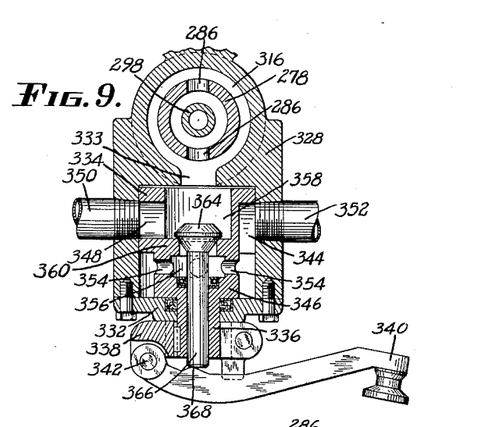
Fig. 9 is a horizontal sectional view through the axis of the reversing valve showing the valve in position to direct fluid to the rear ends of the drive cylinders to convey material toward the mine face.

It should be noted that the handle 340 points in the direction in which material is moved by the apparatus. Thus, with the handle as shown in Fig. 10, material is conveyed leftward or away from the face, and with the handle as shown in Fig. 9, material is moved toward the face.

If it be desired to stop the apparatus quickly without turning the handle 340 to its neutral position shown in Figs. 3, 4, 5, and 6, all that is necessary is for the operator to push on the handle in a direction parallel to the axis of rotation of the valve body 334. Such a push on handle 340 will unseat the closure member 364 and will immediately bypass the drive pump to the reservoir by way of pump discharge 264, groove 314, ports 284, the interior of sleeve 278, ports 286, groove 316, hollow 358, passage 362 in the wall 360 of the body member 334, ports 354 to the interior of bore 330, passage 370 and conduit 372, whereupon movement of the shaker and loader pans will immediately stop.

It will be appreciated by those skilled in the art that the adjustment of the movable gear block 234 by the hand wheel 254 will determine the length of stroke of the conveyor by determining the quantity of fluid displaced by the pump. It will further be understood that the length of the interval between successive operations of the reciprocable member 292 by cam 386 will be determined by the gear ratio of the drive for the cam. Thus, if the conveyor is to be set up to convey material up a grade of a substantial pitch, it will be advantageous to have the conveyor operate at maximum stroke length and at an optimum frequency. If, on the other hand, the conveyor is pitched down it will be found that a short stroke of the conveyor operating at a higher frequency will serve to move material along more efficiently.

Operation of the pan supports

Figure 28:
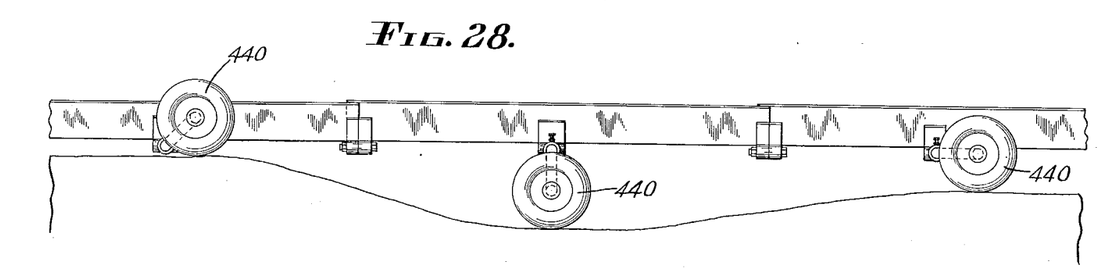
Figs. 28 and 29 are operational views showing respectively a portion of the pan line in side elevation on a mine bottom that is irregular along the length of pan line, and a section of pan which rests on a mine bottom sloping in a direction across the pan line.
Figure 29:
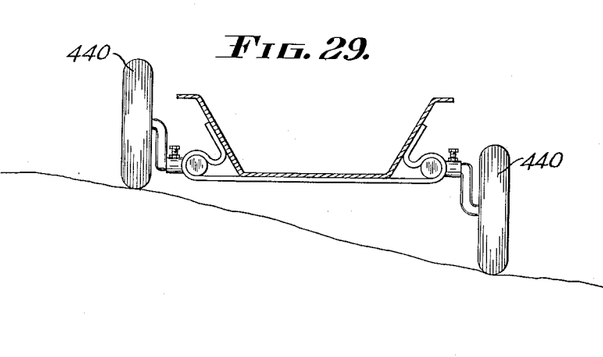

From the foregoing description, it will be evident to those skilled in the art that the pan line may be kept substantially straight in spite of floor irregularities such as those shown in Fig. 28. In order to keep the pan line straight under such conditions, it is merely necessary to adjust the different cranks 450 to provide the proper relationships among the pan bottom, the wheel centers and the mine bottom. In some cases, the wheel center will be above the pan bottom and in other cases it may be below, but adjustment to maintain a straight pan line is possible within rather wide limits without having to resort to blocking. Where the floor is uneven in a direction transverse to the pan line as shown in Fig. 29, the pan bottom may nevertheless be held level by adjusting the cranks of the opposite wheels of a pair of wheel supports. This will make it possible to operate a pan line on an uneven mine bottom without spilling coal or other mineral over one edge of the pan due to tipping of the pan.

With the wheels supporting the pans near a point midway between the ends—as for example ⅜ to ₁⁴₀ of a pan length from one end—it is easy for an operator to take hold of an empty pan at its heavy end and maneuver it around in the mine, getting it into position to connect to the pan line or in taking a pan section out of the pan line, or any other manual handling that may be required.

From the foregoing, it will be evident that this invention presents certain advantages over the prior art in that the pans are in tension on the return or idle stroke. This is the faster half of the cycle of pan motion, and with the pans in tension instead of in compression as is usual, it is possible to use lighter gage pans, a longer pan line, or more rapid acceleration of the pan line, or all three or any two of these advantages. The invention, furthermore, makes it readily feasible to move timbers to the face while the face is being undercut and shot down.

It will also be evident that a further advantage lies in the fact that the pan line passes through the drive head, with driving mechanism being disposed at both sides of the pan line. In prior known conveyors, the pan line passes over the drive head, necessitating a substantial elevation of the pan line above the mine bottom. In this invention the pan line is located close to the mine bottom. A further advantage of the invention lies in the wheeled supports for the pans, permitting use of the conveyor over a mine bottom that deviates substantially from a straight line and enabling the operator to keep the pans in a substantially straight line for such operation.

It will be further evident to those skilled in the art that, with a conveyor made according to this invention, in which the drive head is located at the face, there is a substantial advantage over conventional shaker conveyor practice in which the drive head is located at the entry. In practice which has been conventional heretofore, it has been necessary to lengthen the conveyor by adding pans thereto at the face. This practice requires movement of the pans all the way from the entry to the face to permit their attachment to the conveyor. In a conveyor made according to this invention, pans may be added right at the mine entry to lengthen the conveyor pan line.

It will be still further evident to those skilled in the art that, if it be desired, the loading head may be placed at the entry for shaker conveyor operation in the conventional manner. With such use of the invention, the pan line may nevertheless be maintained close to the mine bottom as opposed to present day practice.

It will be evident to those skilled in the art that there is here provided an invention in materials handling apparatus having a great degree of flexibility and adaptability to varying conditions, and that an apparatus made according to this invention is easily managed by a minimum number of workmen. Other advantages will be apparent to those skilled in the art.

While there is in this application specifically described one form which the invention may assume in practice, it will be understood that this form of the same is shown for purposes of illustration, and that the invention may be modified and embodied in various other forms without departing from its spirit or the scope of the appended claims.

I claim:

1. In a reversible hydraulic shaker conveyor, a hydraulic motor connected to reciprocate the reciprocable members of the conveyor, a liquid reservoir, a continuously operating pump connected to supply liquid to the motor from the reservoir for movement of said members in a selected conveying direction, resilient means connected to move said members in the opposite direction, valve means to permit blocking the flow of liquid from the pump to the motor, means to actuate the valve means into said blocking position, a valve in the pump connection to the motor to permit selection of the direction of movement of said members by the motor, and manually operable means to manipulate the valve.

2. A conveyor according to claim 1, and a second valve means to permit by-passing liquid from the pump to the reservoir.

3. A conveyor according to claim 2, in which said second valve means is connected to be operated by the manually operable means.

4. A conveyor according to claim 1, and a second valve means to permit by-passing liquid from the pump to the reservoir, said second valve means being connected to be operated by the manually operable means by a manipulation thereof which is independent of its movements to manipulate the valve to permit said direction selection.

5. In a reversible hydraulic shaker conveyor, a hydraulic motor connected to reciprocate the reciprocable members of the conveyor, a liquid reservoir, a continuously operating pump connected to supply liquid to the motor from the reservoir for movement of said members in a selected conveying direction, resilient means connected to move the reciprocable members in the opposite direction, valve means to permit blocking the flow of liquid from the pump to the motor, means to actuate the valve means into said blocking position, a valve in the pump connec- tion to the motor to permit selection of the direction of movement of said members by the motor, and operating means for the valve to effect said selection.

6. A conveyor according to claim 5, and a second valve means to permit by-passing liquid from the pump to the reservoir.

7. A conveyor according to claim 6, in which said second valve means is connected to be operated by the operating means.

8. A conveyor according to claim 5, in which the operating means consists of a handle rotatable to manipulate the valve, and a second valve means to permit by-passing liquid from the pump to the reservoir, said second valve means being connected to permit such by-passing by movement of the handle means in a plane which includes the axis of rotation of the handle means.

9. In a reversible hydraulic shaker conveyor, a hydraulic motor connected to reciprocate the reciprocable members of the conveyor, a liquid reservoir, a continuously operating pump connected to supply liquid to the motor from the reservoir for movement of said members in a selected conveying direction, resilient means connected to move the members in the opposite direction, valve means to permit blocking the flow of liquid from the pump to the motor, means to actuate the valve means into said blocking position, a valve in the pump connection to the motor to permit selection of the direction of movement of said members by the motor, a second valve means to permit by-passing liquid from the pump to the reservoir, handle means manipulable to move the valve to effect said direction selection and manipulable to actuate said second valve means to by-pass liquid.

10. A conveyor according to claim 9, in which the handle means is rotatable about an axis of rotation to accomplish one function and is hingedly mounted for pivotal movement in a plane which includes the axis of rotation to accomplish the other function.

11. A conveyor according to claim 10, in which the first-named function is movement of the valve to effect said direction selection and said other function is the actuation of said second valve means.

12. In a hydraulic shaker conveyor, a cylinder having a piston reciprocable therein in either direction from a neutral position, resilient means connected to bias the piston toward its neutral position, a shaker pan connected to be reciprocated by the cylinder-piston assembly, a hydraulic fluid reservoir, a pump having an intake and a discharge, means to conduct fluid from the reservoir to the pump intake, stop-valve means connected to receive fluid from the pump discharge, means to conduct fluid from the stop-valve means to the cylinder including a valve to determine the direction of piston reciprocation by the fluid, said last named means including also another valve operable to by-pass fluid flow from the pump to the reservoir and simultaneously to vent the cylinder to the reservoir, means to operate the stop-valve means, means to operate the last named valve, and means to conduct fluid from the last named valve to the reservoir.

13. The combination of claim 12, and a hydraulic accumulator connected to the pump discharge.

14. The combination of claim 13, in which the pump is of a rotary type and in which the stop-valve means is automatically operated to perform its stated function at intervals of a predetermined number of revolutions of the pump.

15. The combination of claim 12, in which the pump is of a rotary type and in which the stop-valve means is automatically operated to perform its stated function at intervals of a predetermined number of revolutions of the pump.

16. A combination according to claim 12, in which the pump is of a variable displacement type.

17. A combination according to claim 12, in which said direction-determining valve is manually operable.

18. A combination according to claim 12, in which the pump is of a rotary type and in which the stop-valve is automatically operated to perform its stated function at intervals of a selected number of revolutions of the pump.

19. In a hydraulic shaker conveyor, a cylinder having a piston reciprocable therein, resilient means connected to oppose relative reciprocation of the piston and the cylinder, a shaker pan connected to be reciprocated by the cylinder-piston assembly, the reciprocation being achieved by movement hydraulically in one direction and by the resilient means on the return stroke, a hydraulic fluid reservoir, a pump having an intake and a discharge, means to conduct fluid from the reservoir to the pump intake, a stop-valve, means to conduct fluid from the pump discharge to the stop-valve, means to conduct fluid from the stop-valve to the cylinder including a valve to determine the direction of hydraulic movement as aforesaid, said last-named means including also another valve operable to by-pass fluid flow from the pump to the reservoir and simultaneously to vent the cylinder to the reservoir, means to operate the last-named valve, means to operate the stop-valve, and means to conduct fluid from the direction-determining valve to the reservoir.

20. The combination of claim 19, and a hydraulic accumulator connected to the pump discharge.

21. The combination of claim 20, in which the pump is of a rotary type and in which the stop-valve means is automatically operated to perform its stated function at intervals of a predetermined number of revolutions of the pump.

22. The combination of claim 19, in which the pump is of a rotary type and in which the stop-valve means is automatically operated to perform its stated function at intervals of a predetermined number of revolutions of the pump.

23. A combination according to claim 19, in which the pump is of a variable displacement type.

24. A combination according to claim 19, in which said direction-determining valve is manually operable.

25. A combination according to claim 19, in which the pump is of a rotary type and in which the stop-valve is automatically operated to perform its stated function at intervals of a selected number of revolutions of the pump.

26. In a reversible hydraulic shaker conveyor, a cylinder having a piston therein reciprocable in either direction from a neutral position, a shaker pan having a pair of brackets secured thereto, means to connect one of the brackets to move the pan by the relative reciprocation of piston and cylinder, resilient means connected to the other bracket to effect pan movement in the other direction, and means to supply fluid to the cylinder for pan movement thereby in a selected conveying direction, movement on the return stroke being accomplished by the resilient means.

27. In a hydraulic shaker conveyor, a cylinder having a piston therein reciprocable in either direction from a neutral position, a shaker pan having a pair of brackets secured thereto, means to connect one of the brackets to move the pan by the relative reciprocation of piston and cylinder, resilient means connected to the other bracket to oppose pan movement by said relative reciprocation, the resilient means comprising a pair of coil springs disposed about the cylinder with said other bracket being between them and being slidable on the cylinder, and means to supply fluid to the cylinder for pan movement thereby in a selected direction, movement on the return stroke being accomplished by the resilient means.

28. A conveyor according to claim 27, in which said means to connect consists of a piston rod secured to the piston and to said one of the brackets.

29. A conveyor according to claim 26, in which said means to connect consists of a piston rod secured to the piston and to said one of the brackets.

30. In a hydraulic shaker conveyor, a shaker pan having a plurality of brackets secured thereto, one of the brackets having an opening therethrough at each end, a drive cylinder disposed along each side of the pan and passing through said opening, the pan bracket being slidable with respect to the drive cylinders, a coil spring on each cylinder at each side of said one of the brackets, each such spring abutting at one end against said one of the brackets, an abutment for the other end of each such spring, said abutments being stationary with respect to the cylinders, a piston and piston rod mounted for reciprocation in each cylinder, means to connect the piston rods with another of the plurality of brackets, and means to supply fluid to the cylinders for pan movement thereby in a selected direction, movement on the return stroke being accomplished by the springs.

31. A conveyor according to claim 30, in which each piston rod passes through its cylinder at both ends thereof and engages a pan bracket at each end.

JOSEPH F. JOY.

References Cited in the file of this patent

UNITED STATES PATENTS

| Number | Name | Date |
|---|---|---|
| 1,354,062 | Payne | Sept. 28, 1920 |
| 1,541,712 | Horn | June 9, 1925 |
| 1,915,198 | Nyborg | June 20, 1933 |
| 1,968,422 | Proctor | July 31, 1934 |
| 2,049,346 | Bebinger | July 28, 1936 |
| 2,214,755 | Tafel | Sept. 17, 1940 |
| 2,243,364 | Trautman | May 27, 1941 |
| 2,322,481 | Sloane | June 22, 1943 |
| 2,366,121 | Martin-Hurst | Dec. 26, 1944 |
| 2,404,058 | Hagenbook | July 16, 1946 |
| 2,410,481 | Doberstein | Nov. 5, 1946 |
| 2,449,777 | Holstein | Sept. 21, 1948 |
| 2,434,127 | Sloane | Jan. 6, 1948 |
| 2,452,978 | Woldring | Nov. 2, 1948 |
| 2,473,193 | Campion | June 14, 1949 |
| 2,503,867 | Finlayson | Apr. 11, 1950 |

FOREIGN PATENTS

| Number | Country | Date |
|---|---|---|
| 627,912 | Great Britain | Aug. 18, 1949 |